United States Patent
Ogawa et al.

(10) Patent No.: US 10,524,144 B2
(45) Date of Patent: Dec. 31, 2019

(54) MOBILE TERMINAL TESTING APPARATUS AND FREQUENCY INFORMATION SETTING METHOD THEREFOR

(71) Applicant: Anritsu Corporation, Kanagawa (JP)

(72) Inventors: Shinji Ogawa, Kanagawa (JP); Junya Tanaka, Kanagawa (JP); Yasuyuki Matsuyama, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 35 days.

(21) Appl. No.: 15/979,582

(22) Filed: May 15, 2018

(65) Prior Publication Data

US 2018/0343575 A1   Nov. 29, 2018

(30) Foreign Application Priority Data

May 25, 2017   (JP) .................................. 2017-103662

(51) Int. Cl.
| | | |
|---|---|---|
| *H04W 24/08* | (2009.01) | |
| *H04W 72/04* | (2009.01) | |
| *H04W 24/06* | (2009.01) | |
| *H04L 5/00* | (2006.01) | |
| *H04W 88/08* | (2009.01) | |
| *H04W 88/02* | (2009.01) | |
| *H04W 8/24* | (2009.01) | |

(52) U.S. Cl.
CPC .............. *H04W 24/08* (2013.01); *H04L 5/00* (2013.01); *H04W 24/06* (2013.01); *H04W 72/0453* (2013.01); *H04W 8/24* (2013.01); *H04W 72/048* (2013.01); *H04W 88/02* (2013.01); *H04W 88/08* (2013.01)

(58) Field of Classification Search
CPC ..... H04B 7/2123; H04B 7/212; H04W 72/04; H04W 84/12; H04W 74/0816; H04W 74/04; H04W 72/0406; H04W 88/08; H04W 84/08; H04W 80/04; H04W 88/06; H04W 84/18; H04W 74/08; H04W 76/00; H04W 76/02; H04L 2012/5608
USPC ..... 370/322, 329, 341, 348, 310.2, 328, 338
See application file for complete search history.

(56) References Cited

U.S. PATENT DOCUMENTS

| | | | | |
|---|---|---|---|---|
| 2014/0293818 | A1* | 10/2014 | Sesia | H04B 17/318 370/252 |
| 2016/0165495 | A1 | 6/2016 | Awano et al. | |
| 2016/0254871 | A1* | 9/2016 | Russ | H04B 17/29 455/67.14 |
| 2018/0006774 | A1* | 1/2018 | Yiu | H04L 5/0091 |

* cited by examiner

*Primary Examiner* — Brenda H Pham
(74) *Attorney, Agent, or Firm* — Pearne & Gordon LLP

(57) ABSTRACT

A mobile terminal testing apparatus capable of facilitating a setting of a combination of frequency bands of carrier aggregation and a setting of frequency information of each band and easily performing a test of the carrier aggregation is provided. A mobile terminal testing apparatus includes a control unit (14) that acquires UE capability information of a mobile communication terminal (2), displays a list of combinations of frequency bands set in a carrier aggregation band combination list of the UE capability information, and sets frequency information of each cell of carrier aggregation according to a frequency band in a combination selected from the list.

2 Claims, 3 Drawing Sheets

MOBILE TERMINAL TESTING APPARATUS AND FREQUENCY INFORMATION SETTING METHOD THEREFOR

TECHNICAL FIELD

The present invention relates to a mobile terminal testing apparatus that performs a test on a mobile communication terminal.

BACKGROUND ART

When a mobile communication terminal such as a mobile phone or a data communication terminal has been developed, it is necessary to test whether or not the developed mobile communication terminal can normally perform communication. Therefore, a mobile communication terminal that is a test target is connected to a testing apparatus that operates as a pseudo base station that simulates a function of an actual base station, communication is performed between the testing apparatus and the mobile communication terminal, and a test for confirming content of the communication is performed.

Further, in 3rd Generation Partnership Project (3GPP) in which a standard for wireless communication is created, a carrier aggregation technology is introduced under a Long-Term Evolution-Advanced (LTE-A) standard. This carrier aggregation is intended to improve a transmission speed by performing communication using a plurality of LTE carriers simultaneously.

In the carrier aggregation, communication is performed using a plurality of LTE carriers called component carriers (hereinafter also referred to as CCs). In the carrier aggregation, communication is performed using one primary component carrier (hereinafter also referred to as a "PCC") which is a CC required for the mobile communication terminal to maintain a connection with a base station and one or more secondary component carriers (hereinafter also referred to as SCCs) which are CCs that are used to improve a transmission speed between the mobile communication terminal and the base station.

Patent Document 1 discloses facilitating replacement of parameters of a PCC and an SCC to improve simplicity of a test and shorten a test time.

RELATED ART DOCUMENT

Patent Document

[Patent Document 1] US 2016/0165495 A1

DISCLOSURE OF THE INVENTION

Problem that the Invention is to Solve

In carrier aggregation, a combination of frequency bands in which the carrier aggregation is performed is defined. Further, in a mobile communication terminal that performs the carrier aggregation, a combination of frequency bands to which the mobile communication terminal can correspond is determined and set.

When test of the carrier aggregation is performed, it is necessary to perform a setting of a testing apparatus in a combination of frequency bands to which the mobile communication terminal corresponds, but the combination to which mobile communication terminal corresponds is not known and the setting of the testing apparatus cannot be performed unless a specification of the mobile communication terminal is recognized.

Further, it is necessary to perform a setting of a plurality of CCs that perform the carrier aggregation, which takes time.

Therefore, an object of the present invention is to provide a mobile terminal testing apparatus capable of facilitating a setting of a combination of frequency bands of carrier aggregation and a setting of frequency information of each band and easily performing a test of the carrier aggregation.

Means for Solving the Problem

A mobile terminal testing apparatus according to the present invention is a mobile terminal testing apparatus that simulates a base station for mobile communication and tests a mobile communication terminal, the mobile terminal testing apparatus including a control unit that acquires UE capability information of the mobile communication terminal through communication with the mobile communication terminal and sets frequency information of each component carrier (CC) that is used in a test of carrier aggregation on the basis of a carrier aggregation band combination list included in the UE capability information.

With this configuration, the frequency information of each CC of the carrier aggregation is set in a combination of the frequency bands to which the mobile communication terminal corresponds. Therefore, it is possible to easily set the combination of the frequency bands that is used in the test of the carrier aggregation and the frequency information of each frequency band and to easily perform test of the carrier aggregation.

Further, in the mobile terminal testing apparatus of the present invention, the control unit displays a list of combinations of frequency bands set in the carrier aggregation band combination list on a display unit and sets frequency information of each CC that is used in the test of the carrier aggregation according to the frequency band in the combination selected from the list by a user.

With this configuration, the list of the combinations of frequency bands to which the mobile communication terminal corresponds is displayed on the display unit, and the frequency information of each CC that is used in the test of the carrier aggregation is set in a combination of frequency bands selected from the list by the user. Therefore, it is possible to perform the setting of the frequency information in a combination of frequency bands according to a need of the user, and to easily perform the test of carrier aggregation.

Further, in the mobile terminal testing apparatus of the present invention, the control unit discriminates a frequency band that is able to be set as a primary component carrier (PCC) on the basis of the carrier aggregation band combination list and displays the list of combinations of the frequency bands including information on a frequency band that is set as the PCC on the display unit.

With this configuration, a frequency band that is able to be set as the PCC is discriminated and the list of combinations of the frequency bands including the frequency band serving as the PCC and the frequency band serving as the SCC is displayed on the display unit. Therefore, it is unnecessary to discriminate the frequency band that can be set as the PCC and to set the frequency information, and it is possible to easily perform the test of carrier aggregation.

Further, a frequency information setting method for a mobile terminal testing apparatus of the present invention is a frequency information setting method for a mobile terminal testing apparatus that simulates a base station for mobile communication and tests a mobile communication terminal, the frequency information setting method including: a step of acquiring UE capability information of the mobile communication terminal through communication with the mobile communication terminal when setting frequency information of each CC that is used in a test of carrier aggregation; and a step of setting frequency information of each CC that is used in the test of the carrier aggregation on the basis of a carrier aggregation band combination list included in the UE capability information.

Further, in the frequency information setting method for a mobile terminal testing apparatus of the present invention includes a step of displaying a list of combinations of frequency bands set in the carrier aggregation band combination list on a display unit; and a step of setting frequency information of each CC that is used in the test of the carrier aggregation according to the frequency band in the combination selected from the list by a user.

Further, in the frequency information setting method for a mobile terminal testing apparatus of the present invention includes a step of discriminating a frequency band that is able to be set as a primary component carrier (PCC) on the basis of the carrier aggregation band combination list; and a step of displaying the list of combinations of the frequency bands including information on a frequency band that is set as the PCC on the display unit.

With this configuration, the frequency information of each CC that is used in a test of the carrier aggregation is set in a combination of the frequency bands to which the mobile communication terminal corresponds. Therefore, it is possible to easily set the combination of the frequency bands that are used in the test of the carrier aggregation and the frequency information of each frequency band and to easily perform test of the carrier aggregation. [Advantage of the Invention]

The present invention can provide a mobile terminal testing apparatus capable of easily performing a test of carrier aggregation.

BEST MODE FOR CARRYING OUT THE INVENTION

Hereinafter, a mobile terminal testing apparatus according to an embodiment of the present invention will be described in detail with reference to the drawings.

Figure 1:
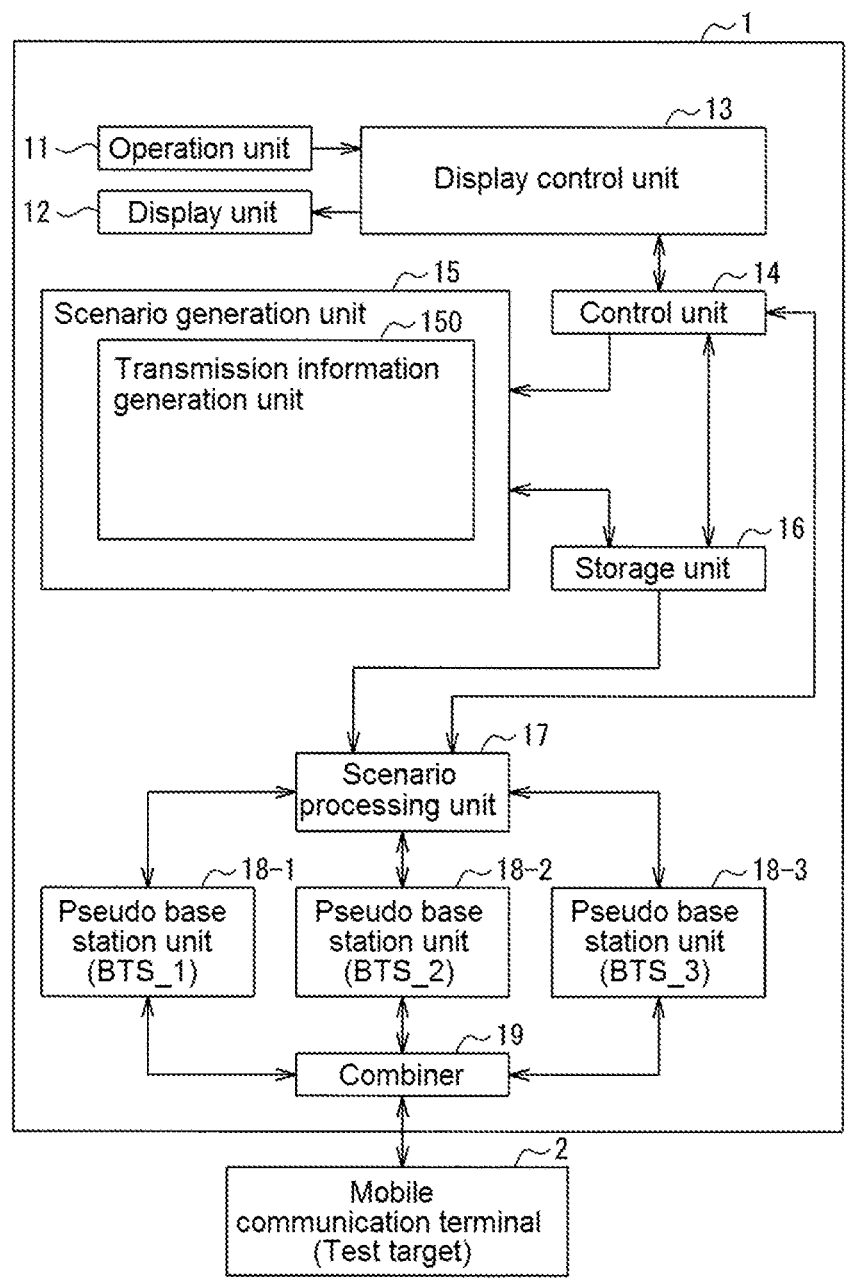
FIG. 1 is a block diagram of a mobile terminal testing apparatus according to an embodiment of the present invention.

In FIG. 1, a mobile terminal testing apparatus 1 according to an embodiment of the present invention transmits or receives a radio signal to and from a mobile communication terminal 2 via a coaxial cable or the like as a pseudo base station.

The mobile terminal testing apparatus 1 includes an operation unit 11, a display unit 12, a display control unit 13, a control unit 14, a scenario generation unit 15, a storage unit 16, a scenario processing unit 17, a pseudo base station unit 18-1, a pseudo base station unit 18-2, a pseudo base station unit 18-3, and a combiner 19.

The operation unit 11 includes input devices such as a keyboard, a mouse, and a touch panel, and outputs, for example, information necessary for generation of a scenario input through an operation to the display control unit 13. The display unit 12 includes an image display device such as a liquid crystal display and displays an image for inputting information necessary for generation of a scenario, an image indicating a state during test, and the like.

The display control unit 13 generates and displays an image to be displayed on the display unit 12, and is configured to perform control of generation and display of an image according to an instruction from the control unit 14. Further, the display control unit 13 changes the display on the display unit 12 on the basis of information input to the operation unit 11 or transmits the information input to the operation unit 11 to the control unit 14.

The control unit 14 causes the display control unit 13 to display a scenario creation screen on the display unit 12 according to an instruction input to the operation unit 11 to cause information necessary for generation of a scenario to be input, or transmits information input to the operation unit 11 on the scenario creation screen to the scenario generation unit 15 to cause the scenario to be generated. Further, the control unit 14 transmits an instruction to the scenario processing unit 17 according to an instruction input to the operation unit 11 to cause the test to be executed on the basis of the scenario stored in the storage unit 16, or causes the display control unit 13 to display, for example, a state during test on the display unit 12 on the basis of information such as a state of the pseudo base station units 18-1, 18-2, and 18-3, a state of communication with the mobile communication terminal 2 transmitted from the scenario processing unit 17.

The scenario generation unit 15 generates a scenario for testing the mobile communication terminal 2 on the basis of the information for scenario generation transmitted from the control unit 14. An operation of the pseudo base station units 18-1, 18-2, and 18-3 or a communication sequence with the mobile communication terminal 2 is set in this scenario. The scenario generation unit 15 includes a transmission information generation unit 150 that generates transmission information to be transmitted from the pseudo base station units 18-1, 18-2, and 18-3 on the basis of the information for scenario generation.

The transmission information generation unit 150 generates notification information of the pseudo base station units 18-1, 18-2, and 18-3, transmission information of a position registration process, or the like on the basis of the information for scenario generation. The transmission information generation unit 150, for example, generates the notification information on the basis of information on settings of operations of base stations simulated by the pseudo base station units 18-1, 18-2, and 18-3 that have been individually set.

The storage unit 16 includes a hard disk device or a flash memory, and stores various scenarios generated by the scenario generation unit 15.

The scenario processing unit 17 reads the scenario stored in the storage unit 16 according to an instruction from the control unit 14 and transmits the notification information to the pseudo base station units 18-1, 18-2, and 18-3 on the basis of the scenario or executes a communication sequence with the mobile communication terminal 2.

The pseudo base station unit 18-1, the pseudo base station unit 18-2, and the pseudo base station unit 18-3 transmit or receive a radio signal to or from the mobile communication terminal 2 according to an instruction from the scenario processing unit 17.

The combiner 19 combines radio signals that are transmitted by the pseudo base station units 18-1, 18-2, and 18-3 and transmits a resultant signal to the mobile communication terminal 2. Further, the combiner 19 transmits a signal received from the mobile communication terminal 2 to each of the pseudo base station units 18-1, 18-2, and 18-3.

Here, the mobile terminal testing apparatus 1 is configured of a computer device (not illustrated) provided with a communication module for performing communication with the mobile communication terminal 2. This computer device includes a central processing unit (CPU), a read only memory (ROM), a random access memory (RAM), a hard disk device, an input and output port, and a touch panel (not illustrated).

A program for causing the computer device to function as the mobile terminal testing apparatus 1 is stored in the ROM and the hard disk device of this computer device. That is, the computer device functions as the mobile terminal testing apparatus 1 by the CPU executing the program stored in the ROM using the RAM as a work area.

Thus, in this embodiment, the storage unit 16 is configured of a RAM or a hard disk device, the display control unit 13, the control unit 14, the scenario generation unit 15, and the scenario processing unit 17 are configured of a CPU, and the pseudo base station units 18-1, 18-2, and 18-3 are configured of a communication module.

In the mobile terminal testing apparatus 1 having such a configuration, when test of the mobile communication terminal 2 is performed, creation of a scenario to be used for test is first performed by the user. When a scenario creation function is selected according to an operation of the operation unit 11 by the user, for example, the control unit 14 causes the display unit 12 to display a scenario creation screen and causes information on base stations simulated by the pseudo base station units 18-1, 18-2, and 18-3, a sequence desired to be executed, or the like to be set.

The user sets various types of information for each base station according to an intended test. The control unit 14 transmits the set information to the scenario generation unit 15 so that a scenario of the pseudo base station is generated. The scenario generation unit 15 generates notification information, sequence information, or the like on the basis of the information received from the control unit 14 and stores the information in the storage unit 16 in association with identification information as a scenario of the pseudo base station.

When the test of the carrier aggregation is performed, it is necessary to set the scenario in a combination of a frequency band to which the mobile communication terminal 2 corresponds. In the mobile terminal testing apparatus 1 of the embodiment, frequency information of a cell as a CC is set on the basis of a carrier aggregation band combination list of UE capability information that can be acquired from the mobile communication terminal 2.

When frequency information of cells simulated by the pseudo base station units 18-1, 18-2, and 18-3 is set from the information that can be acquired from the mobile communication terminal 2, the user connects the mobile terminal testing apparatus 1 to the mobile communication terminal 2 via a cable, and, for example, turns on a power supply of the mobile communication terminal 2 to perform position registration.

When the scenario processing unit 17 receives the UE capability information from the mobile communication terminal 2 during a position registration sequence, the scenario processing unit 17 transmits content thereof to the control unit 14. It should be noted that the present invention is not limited to the information at the time of position registration and the scenario processing unit 17 may request the mobile communication terminal 2 to transmit the UE capability information and transmit the received UE capability information to the control unit 14 according to a request from the control unit 14.

Figure 2:
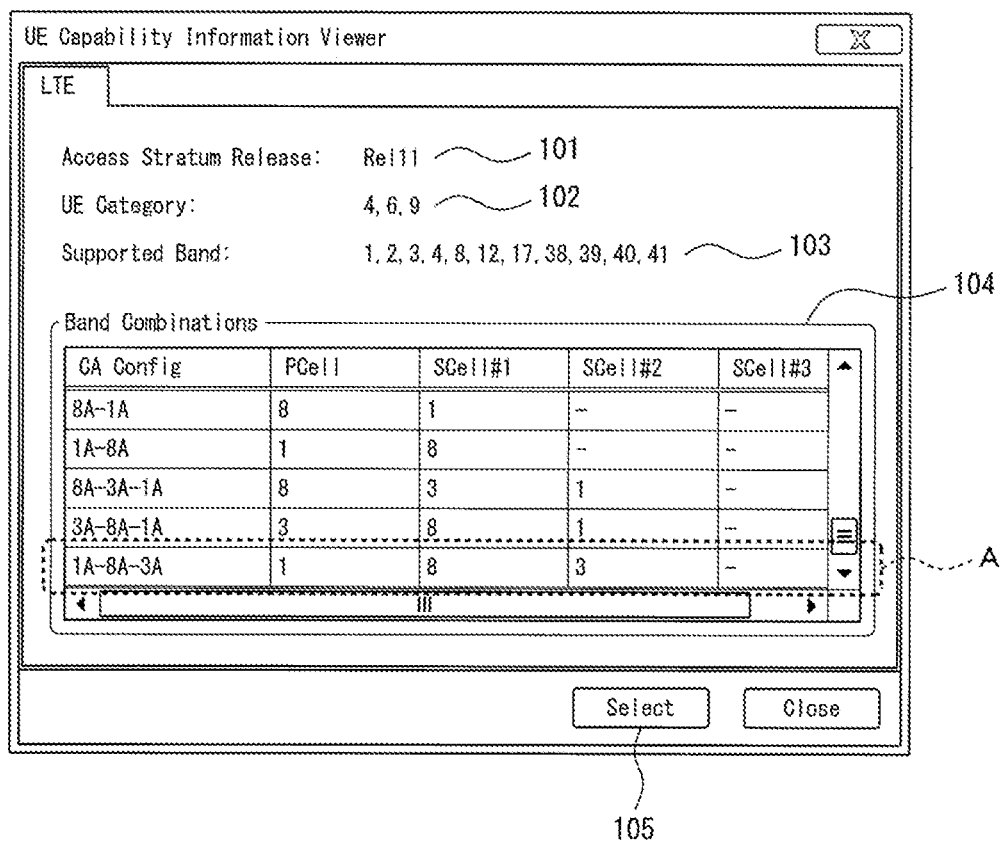
FIG. 2 is a diagram illustrating a display example of a list of combinations of frequency bands in which a mobile communication terminal of a mobile terminal testing apparatus according to an embodiment of the present invention can perform communication.

When the control unit 14 receives the UE capability information from the scenario processing unit 17, the control unit 14 displays a list of combinations of frequency bands in which the mobile communication terminal 2 can perform communication, on the display unit 12 on the basis of the carrier aggregation band combination list of the UE capability information, for example, as illustrated in FIG. 2.

In FIG. 2, a release version display unit 101 displays a release version of 3GPP to which the mobile communication terminal 2 corresponds. A category display unit 102 displays a category of the mobile communication terminal 2. A support band display unit 103 displays a frequency band to which the mobile communication terminal 2 corresponds. The list of combinations of frequency bands in which the mobile communication terminal 2 can perform communication is displayed in a band combination list 104. Such information is information that can be obtained using the UE capability information.

A combination of frequency bands of carrier aggregation is displayed in a column "CAConfig" in the band combination list 104. For example, "1A-8A-3A" of A surrounded by a broken line in FIG. 2 shows a combination of frequency bands of class A of band 1, class A of band 3, and class a of band 8. It should be noted that in FIG. 2, the frequency band serving as PCC is displayed on the leftmost side. That is, in "8A-3A-1A", "3A-8A-1A" and "1A-8A-3A", the combinations of the frequency bands are the same, but the frequency bands serving as the PCC are different. For the frequency band serving as PCC, the frequency band set so that an uplink can be used in the carrier aggregation band combination list is selected.

The frequency band of the cell serving as PCC is displayed in a column "PCell" of the band combination list 104. A frequency band of a cell serving as SCC is displayed in columns "SCell#1", "SCell#2", and "SCell#3" of the band combination list 104.

When a row "1A-8A-3A" indicated by a broken line A, for example, is selected by an operation of the operation unit 11 of the user such as clicking of a mouse or the like from the band combination list 104 displayed as described above, and a selection button 105 is selected, for example, by clicking of a mouse or the like, the control unit 14 sets the frequency information of the cells simulated by the pseudo base station units 18-1, 18-2, and 18-3 in the combination of the selected "1A-8A-3A". As the frequency information, a preset value is set for each frequency band or a median value of each frequency band is set.

Thereafter, a change of another information or frequency information is set by an operation of the operation unit 11 by the user, and when the setting of user ends, the control unit 14 transmits set information to the scenario generation unit 15 such that a scenario of the pseudo base station is generated.

Figure 3:
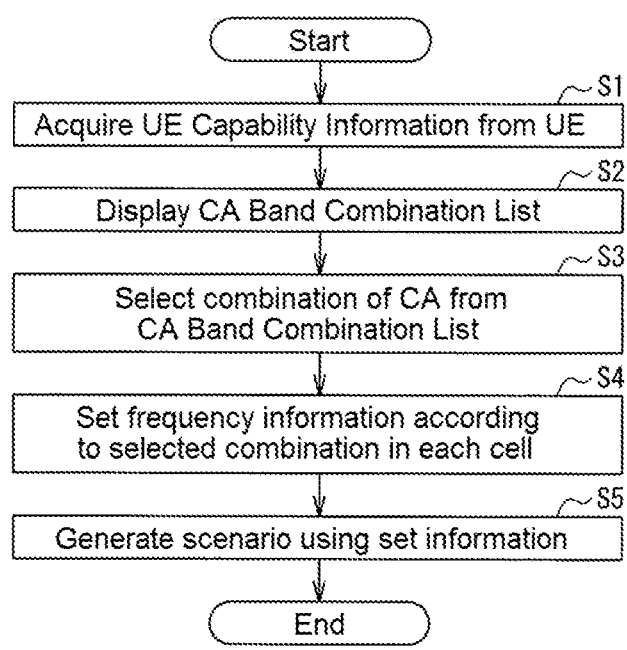
FIG. 3 is a flowchart illustrating a procedure of a frequency setting process of the mobile terminal testing apparatus according to the embodiment of the present invention.

The frequency setting process that is performed by the mobile terminal testing apparatus 1 according to the embodiment configured as described above will be described with reference to FIG. 3. It should be noted that the frequency setting process to be described below is started when a setting of frequency information from the band combination to the mobile communication terminal 2 corresponds is selected by the operation of the operation unit 11 by user.

In step S1, the control unit 14 acquires the UE capability information from the mobile communication terminal 2, for example, by transmitting a message to the mobile communication terminal 2.

In step S2, the control unit 14 causes the display unit 12 to display a CA band combination list as illustrated in FIG. 2 on the basis of the acquired UE capability information.

In step S3, the control unit 14 causes a combination of carrier aggregation frequency bands to be selected from the band combination list 104 illustrated in FIG. 2.

In step S4, the control unit 14 sets frequency information according to the combination of the selected frequency bands as the frequency information of the cells simulated by the pseudo base station units 18-1, 18-2, and 18-3.

In step S5, when the end of the setting of the scenario is selected by the operation of the operation unit 11 by the user, the control unit 14 transmits the set information to the scenario generation unit 15 so that the scenario of the pseudo base station is set.

It should be noted that although the display unit 12 is caused to display a list of combinations of frequency bands in which the mobile communication terminal 2 can perform communication, and the user is caused to select the combination of frequency bands in the embodiment, the control unit 14 may select the combination of frequency bands automatically using a preset selection method.

Thus, in the above-described embodiment, the UE capability information is acquired from the mobile communication terminal 2, the combination of the frequency bands of the carrier aggregation is determined on the basis of the carrier aggregation band combination list of the UE capability information, and the frequency information of each cell is set in the combination of the frequency bands.

Accordingly, the frequency information of each cell is set in a combination of the frequency bands to which the mobile communication terminal 2 corresponds. Therefore, it is possible to easily set the combination of the frequency bands of the carrier aggregation and the frequency information of each frequency band and to easily perform test of the carrier aggregation.

Further, a list of combinations of frequency bands set in the carrier aggregation band combination list is displayed, and the frequency information of each cell is set according to the frequency band in the combination selected from the list.

Accordingly, the combinations of frequency bands to which the mobile communication terminal 2 corresponds are displayed on the display unit 12, and the frequency information of each cell is set in a combination of frequency bands selected from the combinations. Therefore, it is possible to perform the setting of the frequency information in a combination of frequency bands according to a need of the user, and to easily perform the test of the carrier aggregation.

Further, a frequency band set so that an uplink can be used in the carrier aggregation band combination list is set as a frequency band that can be set as a PCC, and the frequency band serving as the PCC and the frequency band serving as the SCC are displayed in the band combination list 104.

Accordingly, the frequency band that can be set as PCC is discriminated, and the frequency band serving as PCC and the frequency band serving as SCC are displayed in the band combination list 104. Therefore, it is unnecessary to discriminate the frequency band that can be set as the PCC and to set the frequency information, and it is possible to easily perform the test of carrier aggregation.

Although the embodiment of the present invention has been disclosed, it will be apparent to those skilled in the art that changes may be made without departing from the scope of the invention. All of such modifications and equivalents are intended to be included in the following claims.

DESCRIPTION OF REFERENCE NUMERALS AND SIGNS

1: mobile terminal testing apparatus
2: mobile communication terminal
11: operation unit
12: display unit
14: control unit
17: scenario processing unit
104: band combination list
105: selection button

What is claimed is:

1. A mobile terminal testing apparatus that simulates a base station for mobile communication and tests a mobile communication terminal, the mobile terminal testing apparatus comprising:
 a processor that acquires UE capability information of the mobile communication terminal through communication with the mobile communication terminal and sets frequency information of each component carrier (CC) that is used in a test of carrier aggregation on the basis of a carrier aggregation band combination list included in the UE capability information,
 wherein the processor displays a list of combinations of frequency bands set in the carrier aggregation band combination list on a display and sets frequency information of each CC that is used in the test of the carrier aggregation according to the frequency band in the combination selected from the list by a user, and
 wherein the processor discriminates a frequency band that is able to be set as a primary component carrier (PCC) on the basis of the carrier aggregation band combination list and displays the list of combinations of the frequency bands including information on a frequency band that is set as the PCC on the display.

2. A frequency information setting method for a mobile terminal testing apparatus that simulates a base station for mobile communication and tests a mobile communication terminal, the frequency information setting method comprising:
 a step of acquiring UE capability information of the mobile communication terminal through communication with the mobile communication terminal when setting frequency information of each CC that is used in a test of carrier aggregation;
 a step of setting frequency information of each CC that is used in the test of the carrier aggregation on the basis of a carrier aggregation band combination list included in the UE capability information;
 a step of displaying a list of combinations of frequency bands set in the carrier aggregation band combination list on a display;
 a step of setting frequency information of each CC that is used in the test of the carrier aggregation according to the frequency band in the combination selected from the list by a user;

a step of discriminating a frequency band that is able to be set as a primary component carrier (PCC) on the basis of the carrier aggregation band combination list; and a step of displaying the list of combinations of the frequency bands including information on a frequency band that is set as the PCC on the display.

* * * * *